(12) United States Patent
Whitty

(10) Patent No.: US 6,560,046 B1
(45) Date of Patent: May 6, 2003

(54) COLLIMATOR POSITIONING SYSTEM

(75) Inventor: James Robert Whitty, Midland (CA)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/042,650

(22) Filed: Jan. 8, 2002

(51) Int. Cl.[7] .............................................. G02B 7/02
(52) U.S. Cl. ...................................... 359/822; 359/826
(58) Field of Search ............................... 359/811, 822, 359/826, 819; 385/33, 34

(56) References Cited

U.S. PATENT DOCUMENTS 6,246,812 B1 * 6/2001 Liu et al. ...................... 385/34
6,246,813 B1   6/2001 Zheng ........................... 385/34
6,396,980 B1 * 5/2002 Liu et al. ...................... 385/34
6,470,120 B2 * 10/2002 Green et al. ................. 385/52

* cited by examiner

Primary Examiner—Georgia Epps
Assistant Examiner—Saeed Seyrafi
(74) Attorney, Agent, or Firm—William C. Schubert; Glenn H. Lenzen, Jr.

(57) ABSTRACT

A collimator positioning system for positioning a collimator on a base member. The positioning system includes a first support rod and a second support rod. The first support rod has a general elongated length with at least two cam surfaces spaced from each other along the length. The second support rod is movable relative to the first support rod to form a variable collimator support area therebetween. The support rods are adapted to be moved relative to each other for varying an angle of inclination or a height of the collimator on the base member.

20 Claims, 3 Drawing Sheets

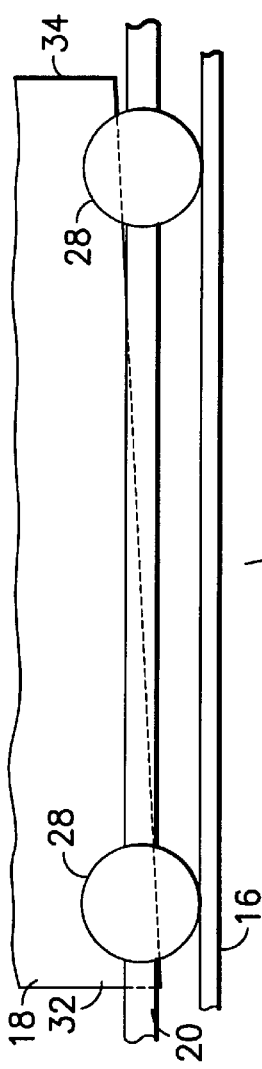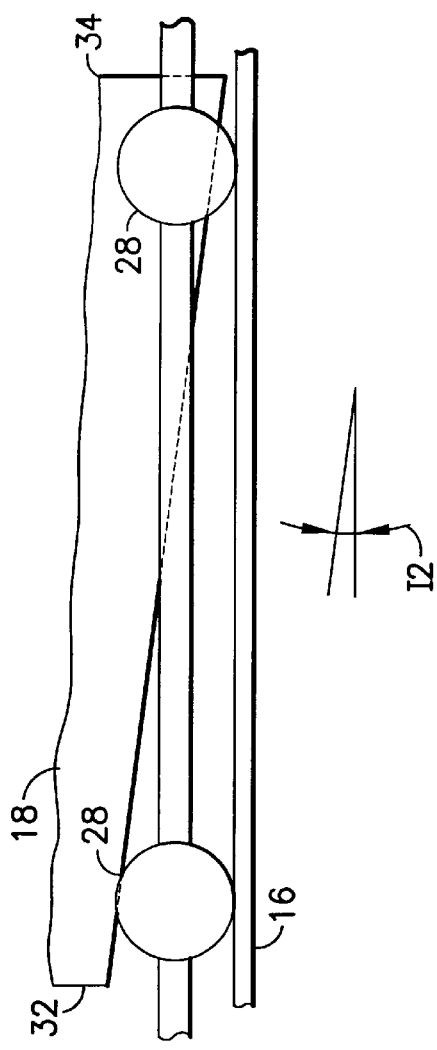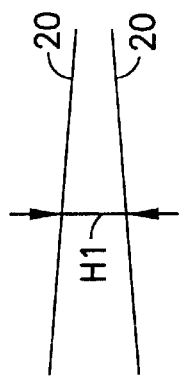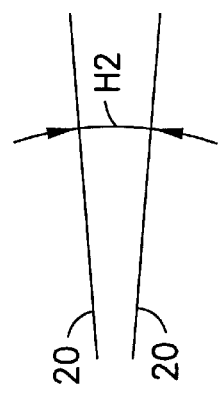

COLLIMATOR POSITIONING SYSTEM

BACKGROUND OF THE INVENTION

1. Field of the Invention

The present invention relates to optical collimators and, more particularly, to a system for positioning a collimator in an assembly.

2. Prior Art

Collimators used in optical filters and connected to fiber optics are generally well known in the art. A collimator can comprise a metal outer housing and can have a general cylinder outer profile. It is known in the art to permanently stationarily attach a collimator to a base plate when forming an optical filter assembly. In order to precisely position the collimator relative to the base plate, a robotic six axis positioner has been used in order to obtain precise alignment. Once the positioner positioned the collimator relative to the base plate, a bonding, such as adhesive or epoxy, was then applied to fixedly and stationarily connect the collimator to the base plate. However, a robotic six axis positioner can be relatively expensive and, the cost for maintaining a robotic six axis can be relatively high.

There is a desire to provide a means for positioning a collimator relative to a base member without the use of a six axis positioner. There is also desired a precise means for adjusting fiber optic collimators that result in an environmentally stable configuration.

SUMMARY OF THE INVENTION

In accordance with one aspect of the present invention, a collimator positioning system is provided for positioning a collimator on a base member. The positioning system includes a first support rod and a second support rod. The first support rod has a general elongated length with at least two cam surfaces spaced from each other along the length. The second support rod is movable relative to the first support rod to form a variable collimator support area therebetween. The support rods are adapted to be moved relative to each other for varying an angle of inclination or a height of the collimator on the base member.

In accordance with another aspect of the present invention, a collimator assembly is provided comprising a base member; two spaced support sections movable relative to each other on the base member; and a collimator located on the support sections in an area between the support sections. The support sections are adapted to be angularly and translationally moved relative to each other to adjust angular positioning and height positioning of the collimator relative to the base member.

In accordance with one method of the present invention, a method of positioning a collimator on a base member is provided comprising steps of locating the collimator on two spaced support members which are located on the base member, the collimator being supported on the support members in a gap between the support members; and moving the two support members relative to each other to vary an angle between the support members or distance between the support members, and thereby moving at least a portion of the collimator relative to the base member.

BRIEF DESCRIPTION OF THE DRAWINGS

The foregoing aspects and other features of the present invention are explained in the following description, taken in connection with the accompanying drawings, wherein:

FIG. 3A is a schematic top plan view of the adjuster rods shown in FIGS. 2A and 2B shown at a first angled position relative to each other;

FIG. 3B is a side elevational view as in FIG. 2B corresponding to the angled position of the adjuster rods shown in FIG. 3A;

FIG. 4A is a schematic top plan view of the adjuster rods shown in FIGS. 2A and 2B shown at a second angled position relative to each other;

FIG. 4B is a side elevational view as in FIG. 2B corresponding to the angled position of the adjuster rods shown in FIG. 4A;

DETAILED DESCRIPTION OF THE PREFERRED EMBODIMENT

Figure 1:
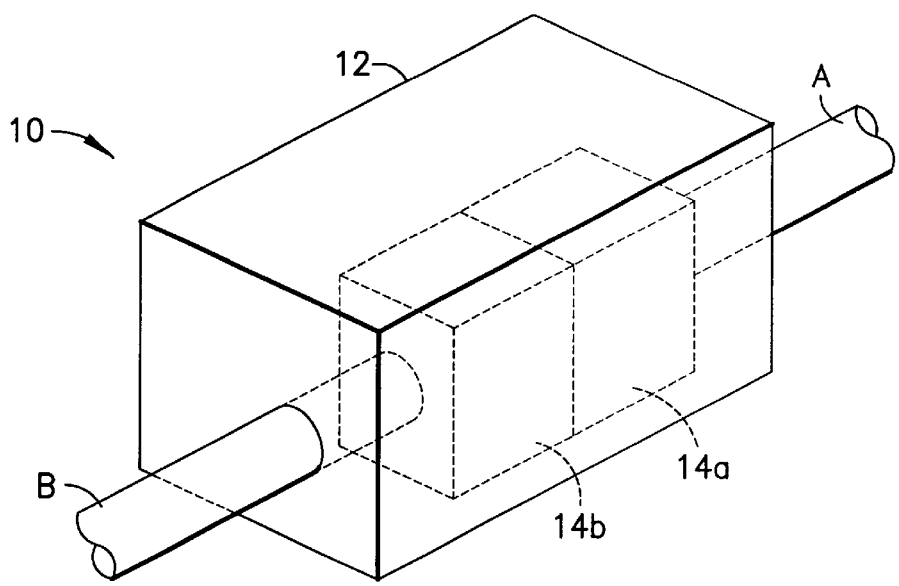
FIG. 1 is a perspective view of an assembly incorporating features of the present invention.

Referring to FIG. 1, there is shown a perspective view of an optical assembly 10 incorporating features of the present invention. Although the present invention will be described with reference to the single embodiment shown in the drawings, it should be understood that the present invention can be embodied in many alternate forms of embodiments. In addition, any suitable size, shape or type of elements or materials could be used.

The assembly 10, in this embodiment, generally comprises a two port packaged filter assembly for connecting two fiber optic members A, B to each other. However, in an alternate embodiment, features of the present invention could be used in a multi-port packaged filter assembly comprising more than two ports. In other types of alternate embodiments, features of the present invention could be used in a selectable filter module, a multiplexer or demultiplexer, an OADM, or any other type of assembly which has a collimator or free space propagation between collimators.

In the embodiment shown in FIG. 1, the assembly 10 generally comprises a housing 12, and two collimator assemblies 14a, 14b. The two collimator assemblies are connected to respective ones of the optical fibers A, B. The two collimator assemblies could be the same, or could be different from each other. The collimator assemblies could be directly connected to each other or could comprise other components therebetween.

Figure 2A:
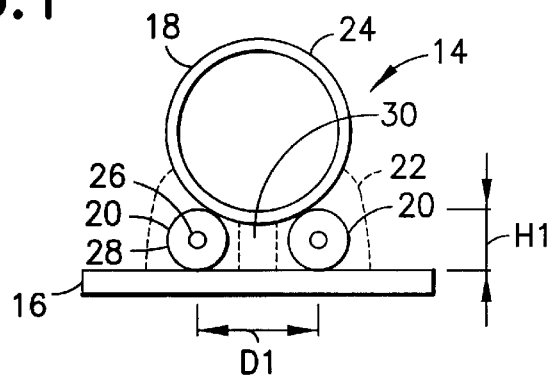
FIG. 2A is a front elevational view of components used to form a collimator assembly incorporating features of the present invention with the adjuster rods shown at a first spaced position relative to each other.
Figure 2B:
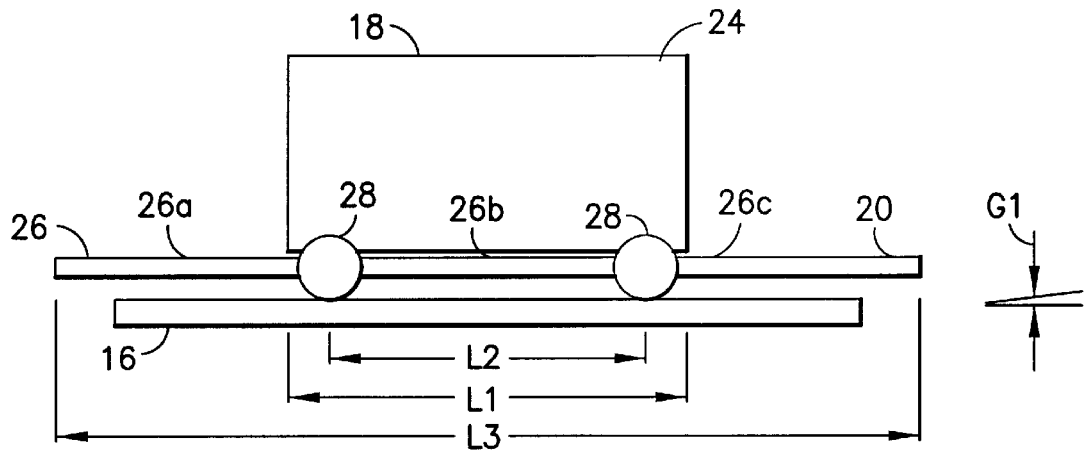
FIG. 2B is a side elevational view of the components shown in FIG. 2A.

Referring also to FIGS. 2A and 2B, the collimator assembly 14 generally comprises a base member 16, a collimator 18, two support sections 20, and a bonder 22. In alternate embodiments, the assembly 14 could comprise additional or alternative components. The base member 16 is preferably a flat base plate comprised of metal. However, in alternate embodiments, the base member 16 could comprise any suitable size and shape. In addition, the base member 16 could be comprised of any suitable type of material(s). In another alternate embodiment, the base member 16 could comprise a member from another component.

The collimator 18 preferably comprises a collimator body 24 which is comprised of metal. However, in alternate embodiments, the collimator body could be comprised of any suitable type of material(s). The collimator has a longitudinal length L1 between its front and rear ends. Collimators are generally well known in the art. In this embodiment, the collimator 18 comprises a general cylindrical outer profile. However, in alternate embodiments, the collimator could comprise any suitable type of shape.

In this embodiment, the bonder 22 is comprised of adhesive or epoxy. The bonder 22 is adapted to fixedly, permanently, stationarily attach the collimator 18, support sections 20 and base member 16 to each other as a unitary structure. In alternate embodiments, any suitable type of bonder could be provided. Additional or alternative bonding techniques could be provided, such as laser welding or soldering. In an alternate embodiment, any suitable type of system for fixing the collimator 18 in a stationary position on the support sections 20 and base member 16 could be provided.

In the embodiment shown, the two support sections 20 are separate, substantially identical members. In an alternate embodiment, the support sections 20 could be provided as a single member having portions which are movable relative to each other. Another alternate embodiment, the assembly could comprise more than two support sections, and/or the support sections might not be identical to each other. The support sections 20 are preferably comprised of metal and are provided as single one-piece members. However, in alternate embodiments, the support sections could be comprised of any suitable type of material(s). In addition, the support sections 20 could each be formed with multiple pieces.

In the embodiment shown, each support section 20 comprises a one-piece, generally elongate adjuster rod. Each adjuster rod generally comprises a rod section 26 and cam sections 28. Each adjuster rod comprises two of the cam sections 28 which are spaced from each other at a centerline distance L2. In an alternate embodiment, the adjuster rods could comprise more or less than two cam sections. The centerline distance L2 is less than the longitudinal length L1 of the collimator 18. The cam sections 28, in the embodiment shown, comprise generally circular or ball shapes. However, in alternate embodiments, the cam sections 28 could comprise any suitable type of shape. The curved outer surfaces of the general ball shapes of the cam sections 28 form curved cam surfaces for engaging the top surface of the base member 16 and the outer lateral side surface of the collimator body 24.

The rod section 26 has a length L3 which is longer than the longitudinal length L1 of the collimator 18. In a preferred embodiment, the length L3 is about twice as long as the length L1. However, in alternate embodiments, the length L3 could have any suitable type of longer length than the collimator 18. In the embodiment shown, the length L3 is longer than the length of the base member 16. The ends of the rod sections 26 extend past the ends of the base member 16. However, in alternate embodiments, the rod sections 26 might not be longer than the length of the base member, and the ends of the rod sections might not extend past the ends of the base member. In the embodiment shown, the rod section 26 has a substantially straight rod shape. However, in alternate embodiments, the rod section 26 could have any suitable type of shape. The rod section 26 extends out of opposite sides of both of the cam sections 28. Thus, the rod section 26 comprises three segments 26a, 26b and 26c; two extending outward at opposite ends of the adjuster rod and one located between the cam sections 28. The front and rear segments 26a and 26c extend relatively far past the front and rear ends of the collimator 18.

The support sections 20 are spaced from each other by a distance D1. The distance D1 is less than the diameter of the collimator 18. The spacing between the support sections 20 and the convex shapes of the collimator exterior lateral side and the cam sections 28 form a receiving area 30 between the support sections 20 for a portion of the collimator 18. The four spaced cam sections 28 form a seat for stably supporting the bottom of the collimator 18 on the top surface of the base member 16. This allows the bottom of the collimator 18 to be located on the cam sections 28 at a height H1 from the top surface of the support member 16.

The four spaced cam sections 28 also form rotatable or slidable cam surfaces for moving the support sections 20 along the top surface of the base member 16 to vary the shape of the receiving area 30. Thus, the height H1 of the collimator 18 relative to the base member 16 and/or the angle G1 of the longitudinal axis of the collimator 18 relative to the longitudinal axis of the base member 16 can be adjusted. In the embodiment shown in FIG. 2B, the support sections 20 are substantially parallel to each other and the angle G1 is 0°. However, the angle G1 could comprise any suitable type of angle.

Referring also to FIG. 3A, a schematic top plan view of the two support sections 20 is shown at a first angled position relative to each other. In this embodiment, the two support sections 20 are angled relative to each other from rear to front at an angle H1. The angle H1 could be any suitable type of angle. Referring also to FIG. 3B, because the two support sections 20 are angled relative to each other, the gap between the front pair of cam sections 28 and the gap between the rear pair of cam sections 28 in the receiving area 30 are different. More specifically, the gap between the front pair of cam sections is larger than the gap between the rear pair of cam sections. With the collimator 18 located on the cam sections 28, the center longitudinal axis of the collimator 18 is angled relative to the top surface of the base member 16 by an angle I1. The front end 32 of the collimator 18 is located closer to the base member 16 than at the rear end 34 of the collimator. Thus, angling the support sections 20 relative to each other by the angle H1 on the base member 16 allows the collimator 18 to be angled relative to the base member 16 by the angle I1.

Referring also to FIG. 4A, a schematic top plan view of the two support sections 20 at a second angled position is shown. In this embodiment, the two support sections 20 are angled relative to each other from front to rear at an angle H2. The angle H2 could be any suitable type of angle. Referring also to FIG. 4B, because the two support sections 20 are angled relative to each other, the gaps between the front pair of cam sections 28 and the rear pair of cam sections 28 in the receiving area 30 are different. More specifically, the gap between the front pair of cam sections is smaller than the gap between the rear pair of cam sections. With the collimator 18 located on the cam sections 28, the center longitudinal axis of the collimator 18 is angled relative to the top surface of the base member 16 by an angle I2. The front end 32 of the collimator 18 is located closer to the base member 16 then at the rear end 34 of the collimator.

Figure 5:
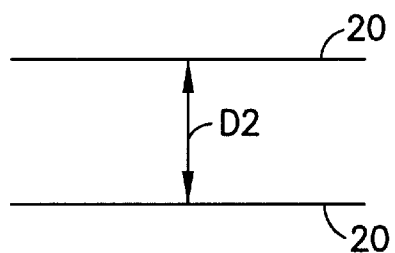
FIG. 5 is a schematic top plan view of the adjuster rods shown in FIGS. 2A and 2B shown at a second spaced position relative to each other.
Figure 6:
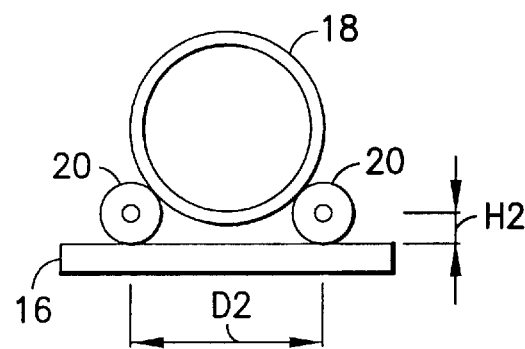
FIG. 6 is a plan front view similar to FIG. 2A, but showing the position of the collimator at a reduced height when the adjuster rods are at the second space position as shown in FIG. 5.

Referring also to FIGS. 5 and 6, FIG. 5 is a schematic top plan view of the two support sections 20 substantially parallel to each other similar to the configuration shown in FIGS. 2A and 2B. However, the embodiment shown in FIGS. 5 and 6 has a spacing D2 therebetween. The spacing of D2 is larger than the spacing D1 shown in FIG. 2A. Therefore, the height H2 is smaller than the height H1. This illustrates that the height between the collimator 18 and the base member 16 can be adjusted based upon the relative positioning or spacing of the two support sections 20 relative to each other without necessarily angling in the two support sections 20 relative to each other.

Figure 7:
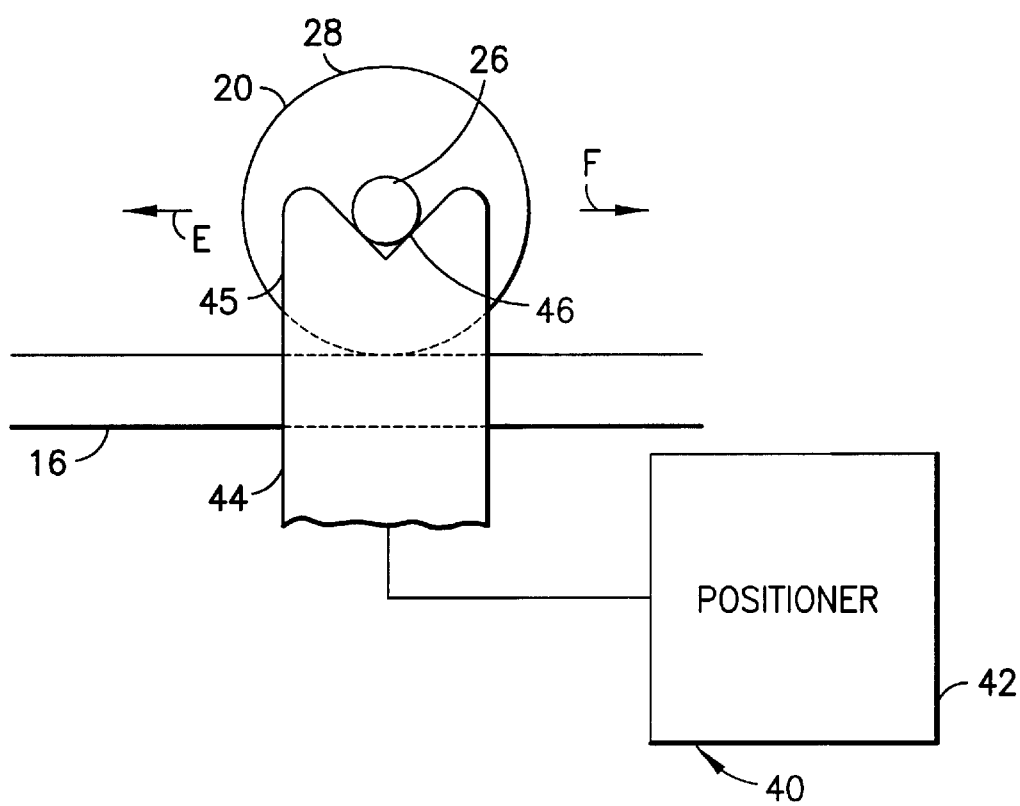
FIG. 7 is a schematic diagram of a positioning system used to position the adjuster rods on the base plate.

Referring also now to FIG. 7, a schematic diagram of a positioning system 40 used to position the support sections 20 on the base member 16 is shown. The positioning system 40 generally comprises a positioner 42 connected to the support sections 20 by end effectors 44 (only one of which is shown). The positioner 42 is preferably a robot or numerically controlled positioning system.

The positioning system 40 comprises two of the end effectors 44; one for each support section 20. In an alternate embodiment, the positioning system might comprise merely one end effector adapted to move the two support sections 20 relative to each other. Each end effector 44 comprises a front section and a rear section adapted to respectively contact the front and rear rod sections 26a, 26c of a single rod section. In an alternate embodiment, the positioning system 40 could comprise more or less than two of the end effectors, such as one end effector when one of the rod sections is fixed on the base member, or four end effector (one for each end of the two rod sections). In the alternate embodiment of four end effectors, for each support section 20 a first one of the end effectors 44 could be located against the front rod section 26a and a second one of the end effectors 44 could be located against the rear rod section 26c.

Each front and rear section of each end effector 44 has a projection 45. The projection 45 of the front section is locatable against the front rod section 26a and the projection 45 of the rear section is locatable against the rear rod section 26c of the same single rod section. The projections 45 can contact the rod sections 26a, 26c from a bottom direction because the rod sections 26a, 26c extend past the ends of the base member 16 (see FIG. 2B).

Each projection 45 comprises a receiving area 46. In the embodiment shown, the receiving area 46 comprises an upwardly facing general V shaped groove for receiving the rod sections 26a, 26c. The projections 45 contact the bottom sides of the rod sections 26a, 26c in the V shaped grooves. However, in alternate embodiments, the end effectors and the receiving area 46 could have any suitable type of shape or arrangement. For example, in an alternate embodiment, the projections 45 could extend in a downward direction and contact the top sides of the rod sections 26a, 26c. In this alternate embodiment, the rod sections 16a, 26c would not need to extend past the ends of the base member 16. In another alternate embodiment, the projections 45 might be orientated horizontally for contacting the rod sections 26a, 26c at their end tips or on lateral sides.

The two projections 45 of each end effector 44 can be moved inward and outward as illustrated by arrows E and F to move the front and rear rod sections 26a, 26c of each support section 20 inward and outward on the base member 16. This can be accomplished by moving the whole end effector 44 inward or outward, and/or twisting the end effector to move one projection 45 outward and the other projection 45 inward. In other words, the two projections 45 do not need to be moved in unison with each other, but could have dissimilar movements to obtain the desired angular positioning of the support sections 20 on the base member 16.

The positioner 42 does not need to be a six axis positioner as in the past. Instead, the positioner 42 can be a much less complicated and less expensive positioner which merely needs to be adapted to move the projections 45 of the end defectors 44 in directions E and F. However, any suitable type of positioner could be provided. In a preferred embodiment, after the support members 20 are moved to a desired position on the base member 16 and relative to each other to obtain a desired positioning of the collimator 18 on the base member 16, the members 16, 18, 20 are permanently stationarily fixed to one another as an assembly by suitable means, such as adhesive or epoxy. The angle and height of the collimator 18 relative to the base member 16 is selected to obtain a desired alignment with a cooperating optical member or assembly.

With the present invention, two adjuster rods, such as rods 20, can be used for supporting a collimator which can provide an increased base length for angular adjustments. This can reduce the collimator positioning resolution. More specifically, because the length of the support sections 20 are much longer than the length of the collimator 18, the distal end of the front and rear rod sections 26a, 26c can be moved a relatively far distance with a much smaller distance being opened or closed between the opposing pairs of cam sections 28. This allows the positioning by the positioning system 40 to be much less tolerance precise than in the prior art six axis positioner. Thus, the resolution of the movement of the end effectors 44 for accurate positioning of the collimator 18 can be reduced, and a less expensive positioning system can be used than in the prior art.

The present invention also permits the adjustment of both the angular and radial position of the collimator. The four cams can provide contact points between the collimator body and the base plate for improved environmental stability by providing a continuous metal to metal contact for improving stability when bonding with adhesives. The metal to metal contact also permits the use of additional bonding techniques such as laser welding or soldering. The cams can provide contact points that remained nominally constant during positional adjustment which maintain the relationship between the expected and actual motions of the collimator. The groove profile of the locators also contribute to maintaining this relationship. Maintaining a linear, low backlash motion of the collimator is important for numerically controlled positioning.

The four cams on an increased base length, adjusted using the groove locators 44, provides a precise adjustment technique requiring a lower resolution positioner than other applications. The continuous metal to metal contact provides enhanced stability to temperature, shock and vibration. The spacing between the support rods can be adjusted to change the angle and height of the collimator.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A collimator positioning system for positioning a collimator on a base member, the positioning system comprising:

a first support rod having a general elongated length with at least two cam surfaces spaced from each other along the length; and a second support rod movable relative to the first support rod to form a variable collimator support area therebetween, wherein the support rods are adapted to be moved relative to each other for varying an angle of inclination or a position of the collimator on the base member.

2. A collimator positioning system as in claim 1 wherein the two cam surfaces comprise general ball shapes.

3. A collimator positioning system as in claim 2 wherein the general ball shapes are connected by a generally straight rod section.

4. A collimator positioning system as in claim 3 wherein the generally straight rod section extends from the ball shapes in respective opposite directions.

5. A collimator positioning system as in claim 1 wherein the first support rod comprises two cam sections forming the two cam surfaces, the two cam sections comprising generally circular profiles.

6. A collimator positioning system as in claim 5 wherein the first support rod comprises a substantially straight section coaxially aligned with the two cam sections and extending through and out of opposite sides of both of the two cam sections.

7. A collimator positioning system as in claim 1 wherein the length of the first support rod is about twice a longitudinal length of the collimator, and wherein the two cam surfaces are spaced from each other at a length less than the longitudinal length of the collimator.

8. A collimator positioning system as in claim 1 wherein the second support rod is substantially identical to the first support rod.

9. A collimator positioning system as in claim 1 wherein the second support rod has a general elongated length with at least two cam surfaces spaced from each other along the length.

10. A collimator assembly comprising:

a base member;

two spaced support sections movable relative to each other on the base member; and a collimator located on the support sections in an area between the support sections, wherein the support sections are adapted to be angularly and translationally moved relative to each other to adjust angular positioning and height positioning of the collimator relative to the base member.

11. A collimator assembly as in claim 10 wherein the two spaced support sections comprise a first adjuster rod and a separate second adjuster rod.

12. A collimator assembly as in claim 11 wherein the first and second adjuster rods each comprise two spaced cam sections connected by a connecting rod section, the connecting rod section extending from two opposite sides of both of the cam sections.

13. A collimator assembly as in claim 11 wherein the second adjuster rod is substantially identical to the first adjuster rod.

14. A collimator assembly as in claim 10 wherein a longitudinal length of the first support section is about twice a longitudinal length of the collimator, and wherein each support section comprises two spaced cam surfaces which are spaced from each other at a length less than the longitudinal length of the collimator.

15. A collimator assembly as in claim 10 further comprising at least one bonding which stationarily connects the base member with the support sections and the collimator.

16. A collimator assembly as in claim 15 wherein the bonding comprises an adhesive.

17. A collimator assembly as in claim 15 wherein the bonding comprises welding or soldering of the support sections to the base member or the collimator.

18. A collimator assembly as in claim 10 wherein the base member, the support sections, and an outer housing of the collimator are comprised of metal.

19. A method of positioning a collimator on a base member, the method comprising steps of:

locating the collimator on two spaced support members which are located on the base member, the collimator being supported on the support members in a gap between the support members; and moving the two support members relative to each other to vary an angle between the support members or distance between the support members, and thereby moving at least a portion of the collimator relative to the base member.

20. A method as in claim 19 further comprising permanently fixing the collimator to the support members and the base member.

* * * * *